Oct. 4, 1938.  J. J. TATUM  2,132,328
DETACHABLE CAR ROOF
Filed Nov. 2, 1936  3 Sheets-Sheet 1
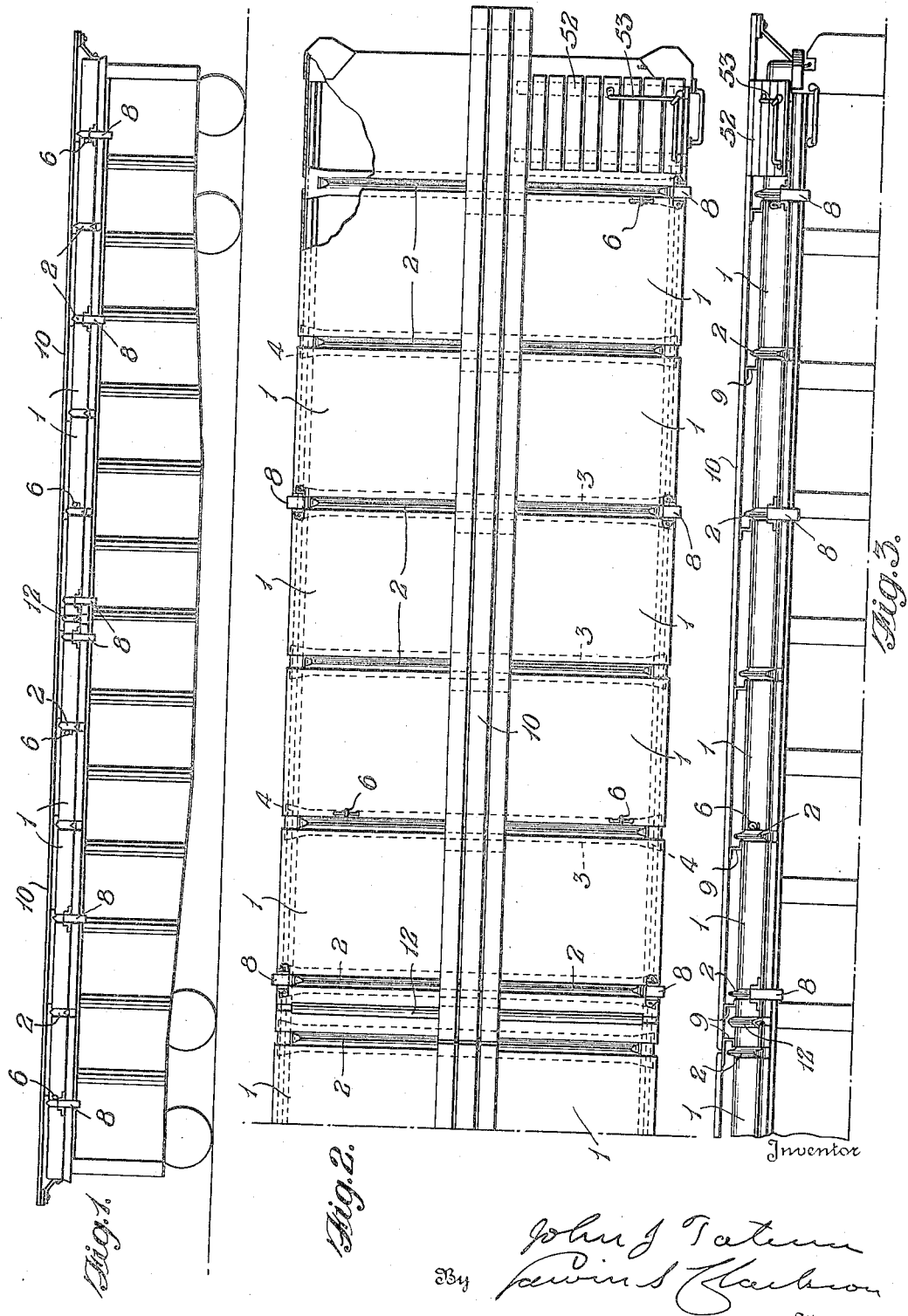

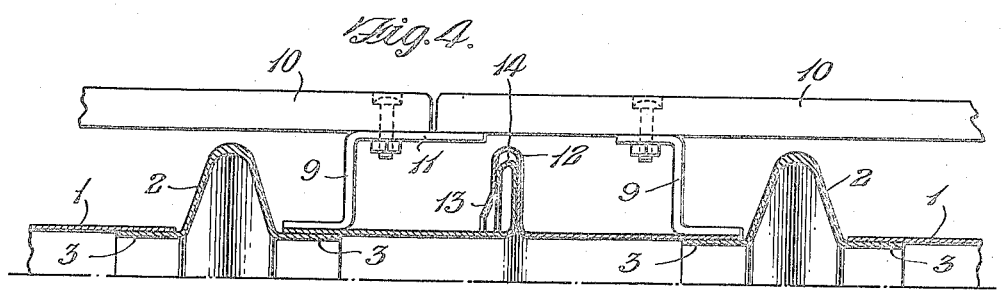
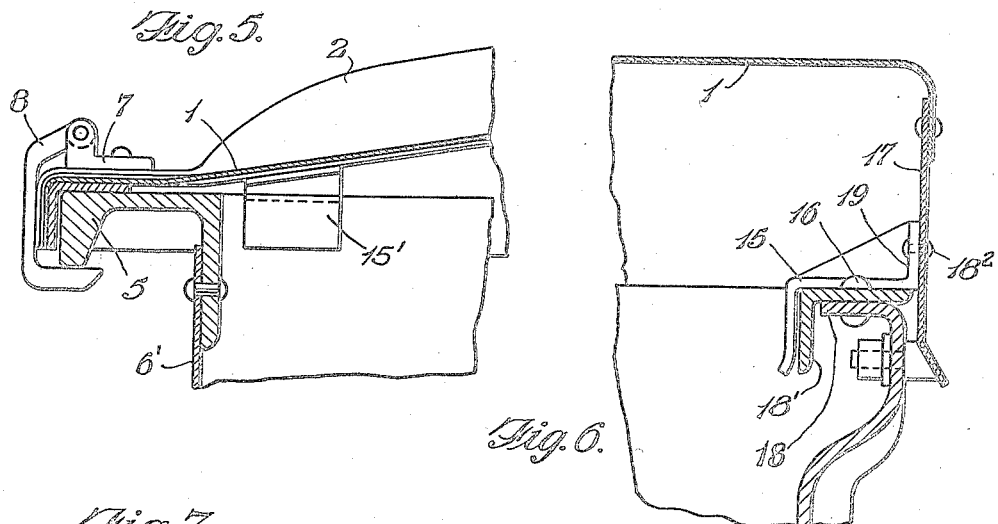
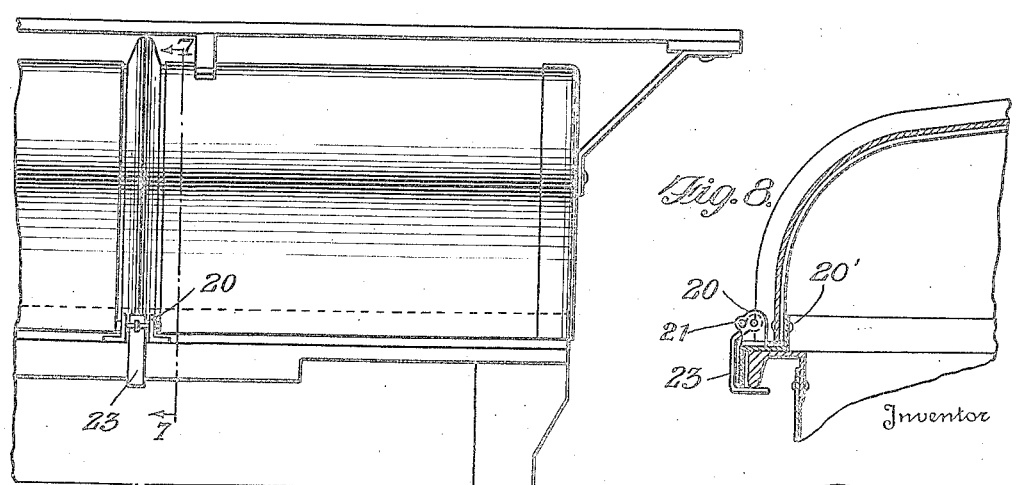

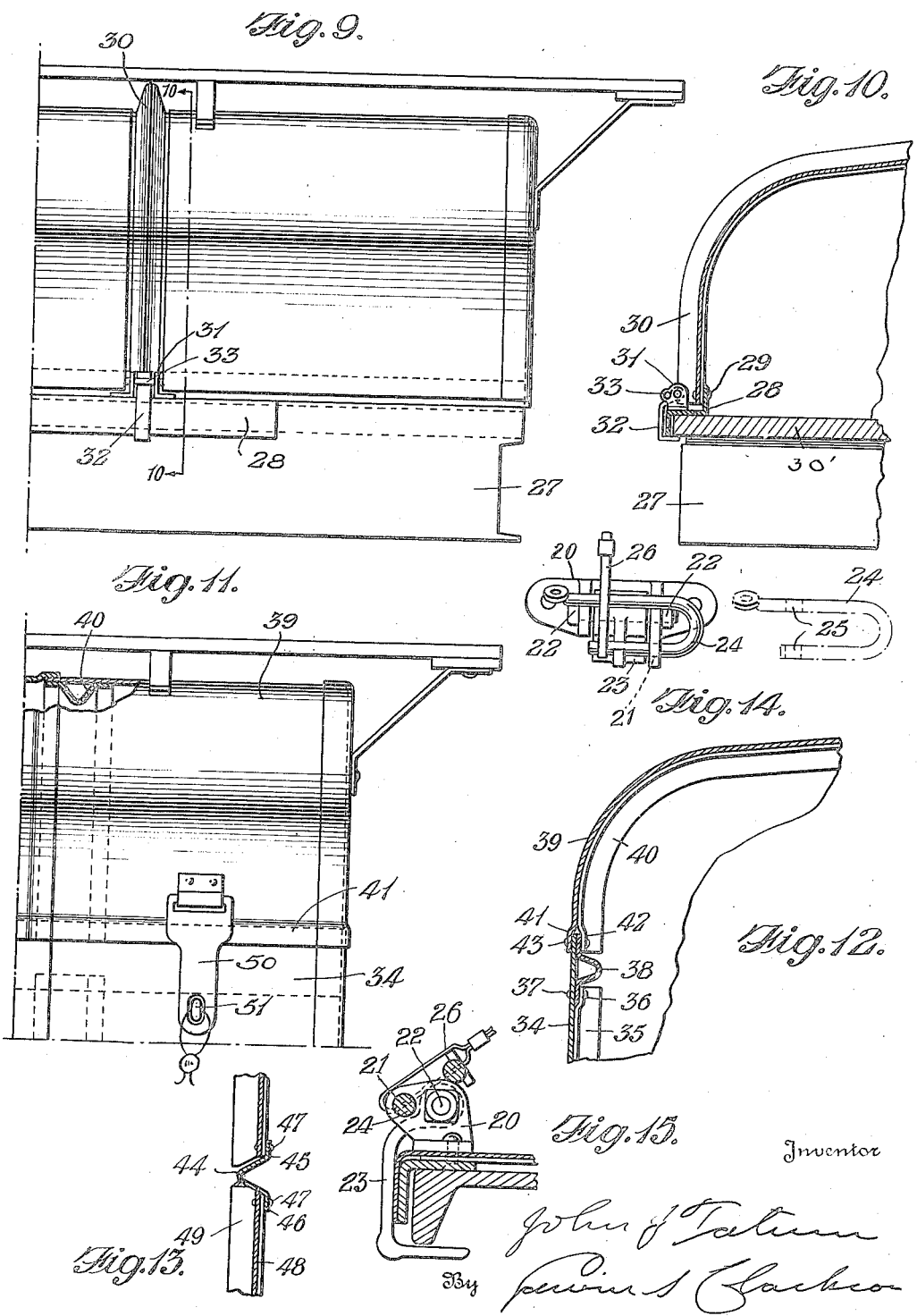

Patented Oct. 4, 1938

2,132,328

UNITED STATES PATENT OFFICE 2,132,328

DETACHABLE CAR ROOF

John J. Tatum, Baltimore, Md.

Application November 2, 1936, Serial No. 108,861

2 Claims. (Cl. 105—377)

Railroad systems own a large number of gondola and flat cars which, under the present practice, are not available for shipping goods which must be protected from the elements and pilfering, hence these types of cars frequently are idle and represent a large unemployed investment.

The object of my invention is to provide a readily attachable and detachable covering for these types of cars whereby such cars may be available, when needed, for shipping goods fully protected from the elements and pilfering, whereby it will be unnecessary for the railroad to build and maintain a large number of what is known as house cars.

Another object of my invention is to reduce the cost of loading a car in that by the use of overhead cranes the shipper can remove the roof from the car, place his lading on the car, and replace the roof much cheaper with cranes than he could load a house car through the doorway by manual labor.

My invention consists further in providing a substantial attachable and detachable roof for flat and gondola cars with means for rigidly securing such roof to the car structure.

My invention consists further in making such car roof in sections with a water tight joint between the sections.

My invention further consists in providing flanged U-shaped carlines for the roof sections.

My invention further consists in providing end walls for the car to close the end of the car.

My invention further consists in providing such roof with the necessary safety foot holds; and with these and other objects in view my invention consists of the parts and combination of parts hereinafter pointed out.

In the drawings:

Figure 1 is a side elevation of a gondola car equipped with my improved roof.

Figure 2 is a top plan view of a portion of Figure 1 with a running board.

Figure 3 is a side elevation of the upper portion of Figure 2.

Figure 4 is an enlarged detail vertical transverse sectional view through the waterproof joint between roof sections.

Figure 5 is an enlarged detail sectional view of a car wall roof sheet and carline with means for detachably securing the roof to the car wall structure.

Figure 6 is an enlarged detail vertical sectional view through the car end wall or gate, car roof and means for attaching the car roof to the end wall or gate.

Figure 7 is an enlarged detail side elevation of a car equipped with my roof and the attaching device.

Figure 8 is a vertical sectional view on the lines 7—7, Figure 7.

Figure 9 is a side elevation of my improved roof applied to a flat car.

Figure 10 is a sectional view on the lines 10—10, Figure 9.

Figure 11 is a detail side elevation for house car equipped with a roof according to my invention.

Figure 12 is a detail sectional view of another embodiment.

Figure 13 is a detail sectional view on a modified joint between the house car and the roof.

Figure 14 is a front elevation of the casting, the locking hook and the car sealing element, the pin of the car sealing element being shown to one side of the view detached.

Figure 15 is a side elevation of Figure 14 with the top cord of the car wall added.

The car roof according to my invention comprises two sections each equal to one-half the length of the car, but it is, of course, obvious that there may be a plurality of sections if the builder so elects without departing from the spirit of my invention.

The roof comprises the roof sheets 1 which may be made of any suitable roofing material and which are given the proper and desired curvature, said roof sheets resting at other side edges on carlines 2, which carlines, preferably, are of U-shape having laterally extended flanges 3 at their side edges, said flanges being flared outwardly as at 4 at their ends whereby a materially larger bearing surface is provided for the ends of the carlines. The roof sheets are secured to the carlines with their edges overlapping the flanges 3 of the carlines, as more clearly shown in Figure 4. The outer, or side, edges of the roof sheets and the outer ends of the carlines are bent downwardly and overlap the outer edges of the top cord member 5 of the car, the downwardly bent edges of the roof sheets overlapping the downwardly bent ends of the carlines, as clearly seen in Figures 2 and 5. These roof sections are provided with lift eyes 6 whereby the roof sections may be removed from the car when desired.

The side wall 6' of the car is provided with the top cord member 5, as shown more clearly in Figure 5, and the carlines are provided at their outer end portions with the casting 7 to which is pivotally mounted a holding hook, or member 8, said holding hook, or member, being adapted when in the position shown in Figure 5 to engage the top cord member thereby securely locking the roof structure to the car.

Suitable brackets 9 resting upon the car roof are provided to support the running board 10, the bracket nearest the dividing line between the sections of the car roof having an elongated member 11 which underlies the end of the running board of an adjacent roof section, as shown in Figure 4. The roof sheets at the end of one of the roof sections is bent upwardly as at 12 in an inverted U shape, the free end of the U being deflected outwardly as at 13. The roof sheet of the adjacent roof section is provided with an upwardly bent member 14 over which the inverted U edge 12 of the sheet of one roof section is positioned. The flared end 13 of the U-shape member 12 facilitates the slipping engagement between these two adjacent roof sheets of the adjacent roof sections.

Figure 6 of the drawings illustrates the manner of connecting an end sheet to the roof section so as to close the end of the car, and this means consists of a Z-shaped gusset 15 which rests upon the end gate top angle 18', which angle is secured to the flange 18 by means of the rivets 16. The end sheet, or wall, 17 is secured to these gussets by means of the rivets 18². These Z-shape gussets function to hold the end wall and roof structure from shifting, the webs of the Z-shape members are adapted to lie upon the upper face of the top cord 18, or other suitable part of the end wall, or gate structure while the vertical upstanding flanges 19 provide means for attaching the end sheets 17 in rigid position.

In the event that it is desirable to lock the roof sections of the car against unauthorized removal I provide, as shown in Figures 8, 14 and 15, the lock or casting 20 provided with openings 21 which are in front and to one side of the pivot 22 of the holding hook 23, and inserted in said openings 21 is a pin 24 which is provided with aligned apertures 25 and pass this pin through the openings 21 after which a suitable car seal device 26 is passed through the apertures 25 whereby the pin 24 is held against unauthorized removal from the openings 21, and while the pin 24 is held in this sealed position it will be readily seen from Figures 8 and 15 that it is impossible to swing the hook 23 on its pivot from locked position whereby the roof structure is held against unauthorized removal. The Z or other desired shaped member 28 is suitably secured to the roof structure.

These holddown devices are preferably secured to the ends of the carlines and may be secured to as many of the carlines as may be desired.

In Figures 9 and 10 I have shown my invention adapted to a flat car 27 which is provided with a Z-shaped member 28, said Z-bar being secured to the roof sheets and carlines by suitable means, such as rivets 29 and extending the length of each removable section of the roof. I suitably secure to the web of the Z-shape, or other desired shape, member 28 a suitable casting or bracket 31 to which the locking hook 32 is pivotally secured, said casting being also provided with an opening 33 for a car seal device. 30 designates the carline.

In Figures 11, 12 and 13 I have shown my invention adapted for application to a house car having the side wall 34 secured to the side wall brace 35, the upper edge of the flange of the brace being spaced as at 36 from the side wall sheet, as clearly shown in Figure 12, and between this space portion 36 and the side wall I secure by means of the rivets 37 a U-shaped section 38 having laterally extended flanges, one of the flanges extending back of the spaced element 36 of the car brace, while the upper flange extends upwardly against and in contact with the upper portion of the side wall of the car. The roof structure comprising roof sheets 39 and carline 40 are at their lower ends spaced apart as at 41 and 42 thereby forming a recess between them into which recess the upper lateral flange of the member 38 and the upper edge of the side wall 34 are positioned and held by means of the rivet 43. In Figure 12 it will be noted that the member 38 has its open side toward the side wall of a car, while in Figure 13 the connecting member 44 and its flanges 45 and 46 are secured by means of rivets 47 outside of the car wall 48 and car wall brace 49. In this form of roof I secure the roof upon the side walls of the car by means of the latch 50 which engages an eye 51 through which a suitable car seal may be passed thereby locking the latch against unauthorized operation. It will, of course, be understood that when the construction shown in Figure 12 is used on a removable roof on a house car the rivets 43 will not be used as the roof will be held to the car by the lock 50.

The roof section is provided with a foot-hold 52 and hand-grab 53.

The use of my improved car roof enables the railroad to provide a flat car, or a gondola car, at nominal expense with a roof whereby these types of cars are readily converted to house cars so that these types of cars may be used as house cars when not required for use as gondola and flat cars, which will result in a material saving to the railroad and obviate the necessity of building and maintaining an unnecessary number of house cars, as well as to provide means for the shipper to load the car by the use of cranes, and for the consignee to unload the car by the use of cranes, from a covered top car by first removing the roof or covering over the lading and thereby reduce the cost of unloading and loading a car that is equipped with a fixed roof such as house cars.

The gussets 15 are secured to the inner face of the end wall 17 of the car roof by rivets 18², and are designed to rest upon the upper edge of the end wall of the car, whereby the roof is held against shifting.

This construction will permit apertures to be provided between carlines 2 at the top of the roof with door covers over the apertures, so that the cars may be used for bulk loading such as sand, coal, gravel, and similar lading. The roof sheets may be made in one or more pieces.

What I claim is:

1. A detachable roof for open top railroad cars comprising two parts, each consisting of inverted U-shaped carlines having base flanges, roof sheets secured on said flanges, said carlines and roof sheets being bent downwardly at their eaves ends to contact with the wall structure of the car, a flange depending from the outer edge of the end roof sheets, end sheets secured at their upper edges to said flanges, Z-shaped gussets secured to the lower edge of the roof end sheets and engaging the end wall of the car, said gussets functioning to hold the roof end sheets and roof structure from shifting in one longitudinal direction relatively to the car body.

2. A detachable car roof comprising two sections, each including inverted U-shaped carlines having base flanges and flattened at their eaves ends and turned downward, roof sheets secured on said flanges and turned downward at their eaves ends, means to lock said roof sections to the car body comprising a casting secured to the eaves end of the carline, a pair of lugs projecting from said casting, a gravity hook pivotally mounted on said lugs and designed to engage the car body, a port in one of said lugs positioned in advance of the pivot of said hook, a U-shaped bolt designed to be seated in said port, aligned ports in the arms of said bolt designed to receive a car seal.

JOHN J. TATUM.